April 20, 1926.
J. A. FRYOUX, JR., ET AL
1,581,312
PISTON RING
Filed August 8, 1924
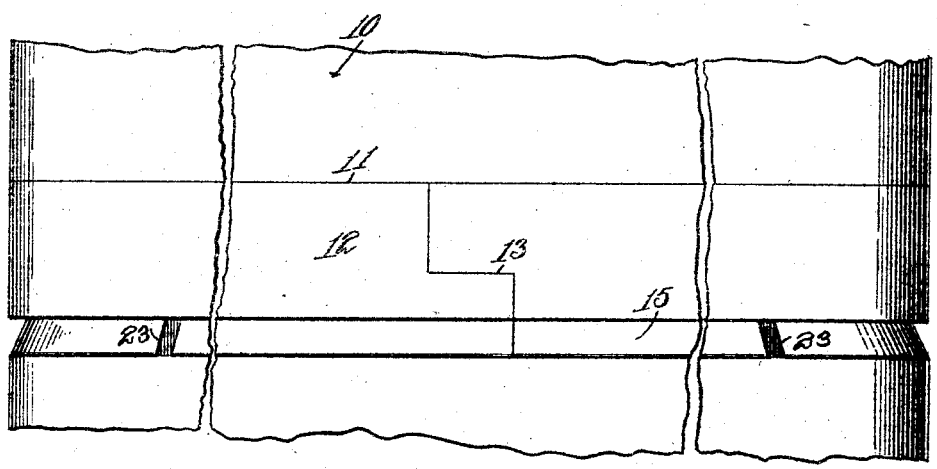
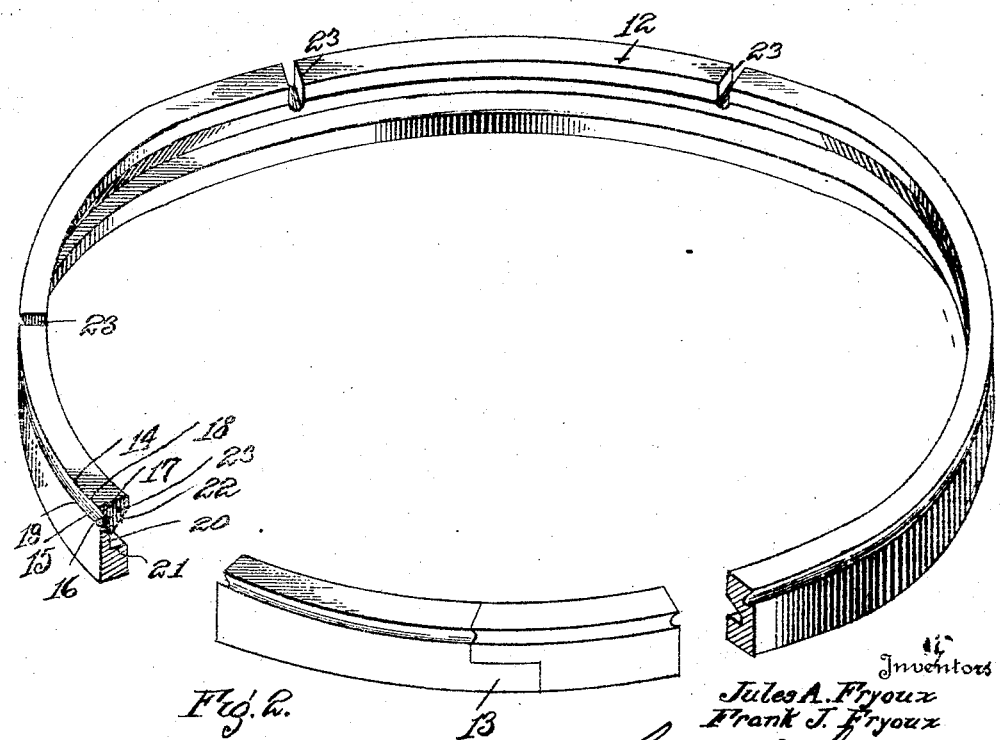
Inventors
Jules A. Fryoux
Frank J. Fryoux
Attorney Patented Apr. 20, 1926.

1,581,312

UNITED STATES PATENT OFFICE.

JULES A. FRYOUX, JR., AND FRANK J. FRYOUX, OF BATON ROUGE, LOUISIANA.

PISTON RING.

Application filed August 8, 1924. Serial No. 730,983.

*To all whom it may concern:*

Be it known that we, JULES A. FRYOUX, Jr., and FRANK J. FRYOUX, citizens of the United States, residing at Baton Rouge, in the parish of East Baton Rouge, State of Louisiana, have invented certain new and useful Improvements in Piston Rings; and we do hereby declare the following to be a full, clear, and exact description of the invention, such as will enable others skilled in the art to which it appertains to make and use the same.

This invention relates to new and useful improvements in packing, and particularly to piston packing for explosive and internal combustion engines.

One object of the invention is to provide a piston packing ring by means of which lubricating oil splashed onto the cylinder wall will be utilized to prevent passage of gases past the piston, and also to prevent passage of oil past the piston.

Another object is to provide a piston ring of such construction that oil will be scraped from the cylinder wall and delivered into a reservoir in the inner concave face of the ring, during the suction stroke of the piston, and blown out again during the compression and power strokes of the piston.

Other objects and advantages will be apparent from the following description when taken in connection with the accompanying drawing.

In the drawing:

Figure 1 is an elevation of a portion of a piston showing the improved ring in the groove thereof.

Figure 2 is an inverted perspective view of a portion of a piston ring, made in accordance with the invention, and with the peripheral face toward the observer.

Referring particularly to the accompanying drawing, 10 represents a portion of a piston, having the peripheral groove 11, in which is seated the ring 12.

The ring comprises a cylindrical body, which is open at one side and formed with the step-lap joint 13. One end of the ring is reduced in diameter, as indicated at 14, and in the peripheral face of this reduced portion there is formed a groove 15, the inner wall 16 of which intersects the axis of the body of the ring at approximately right angles, while the other wall 17 intersects said axis at an acute angle. This wall 17 intersects the peripheral face of the ring body at an acute angle 18, which lies inwardly of the end face of the ring. The wall 16 intersects the peripheral face of the ring at 19, to form a sharp scraping edge, for the purpose of scraping oil from the cylinder wall.

The inner face of the ring body is formed with a circularly extending groove 20, the wall 21 of which is parallel with the adjacent end face of the ring, while the opposite wall 22 is disposed obliquely to the adjacent end face of the ring. Formed transversely through the reduced portion 14 are the regularly spaced grooves 23, the side walls of which are parallel while the top walls are at acute angles to the axis of the ring. It will be noted that these grooves 23 provide direct communication between the grooves 15 and 20.

Assuming the piston to be at the upper end of the cylinder, when said piston moves downwardly, to draw in a charge of live gas, the vacuum created above the piston will extend into the piston ring groove 11, with the result that oil which has been scraped from the cylinder wall by the scraping edge 19, will be drawn into the groove 11, and thence into the groove 20, through the grooves 23. As the piston starts upwardly, on the compression stroke, the pressure of the live gas, above the piston presses on the upper end of the piston ring, and some of the gas finds its way into the ring groove 11, with the result that the force of the gas exerted on the oil in the inner groove 20, will drive the greater portion of said oil from the groove 20, through the grooves 23, and back toward the crank case. Upon the explosion of the charge, and the downward movement of the piston, in its power stroke, the force of the exploding gas causes the expulsion of the remaining oil from the inner ring groove 20, by way of the transverse grooves 23, into the outer groove 15, and thence onto the cylinder wall, whereby to properly lubricate the same.

What is claimed is:

A piston packing comprising a split spring ring, the convex wall of the ring being peripherally grooved adjacent one end thereof with the walls of said groove converging obliquely of the longitudinal axis of the ring and away from said end, the concave face of the ring being peripherally grooved in staggered relation to the first groove and intermediate the ends thereof, said second groove having walls arranged at right angles to the axis of the ring, parallel thereto, and obliquely thereto, respectively, the end face of the ring adjacent the first groove having transverse grooves opening through the concave and convex faces of the ring and having their top walls inclined in the plane of one wall of the first groove and into the second groove.

In testimony whereof, we affix our signatures.

JULES A. FRYOUX, Jr.
FRANK J. FRYOUX.